(12) United States Patent
Lee

(10) Patent No.: US 9,194,242 B2
(45) Date of Patent: Nov. 24, 2015

(54) THERMAL BARRIER COATINGS INCLUDING CMAS-RESISTANT THERMAL BARRIER COATING LAYERS

(75) Inventor: Kang N. Lee, Zionsville, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 122 days.

(21) Appl. No.: 13/811,361

(22) PCT Filed: Jul. 19, 2011

(86) PCT No.: PCT/US2011/044541
§ 371 (c)(1),
(2), (4) Date: May 7, 2013

(87) PCT Pub. No.: WO2012/012431
PCT Pub. Date: Jan. 26, 2012

(65) Prior Publication Data
US 2013/0224457 A1    Aug. 29, 2013

Related U.S. Application Data

(60) Provisional application No. 61/367,067, filed on Jul. 23, 2010.

(51) Int. Cl.
*F01D 5/28* (2006.01)
*C09D 1/02* (2006.01)
*C23C 28/04* (2006.01)

(52) U.S. Cl.
CPC ............... *F01D 5/284* (2013.01); *C09D 1/02* (2013.01); *C23C 28/042* (2013.01); *C23C 28/048* (2013.01); *F01D 5/288* (2013.01);
(Continued)

(58) Field of Classification Search
None
See application file for complete search history.

(56) References Cited

U.S. PATENT DOCUMENTS

| | | | |
|---|---|---|---|
| 3,962,059 A | 6/1976 | Kaup et al. | |
| 3,964,877 A | 6/1976 | Bessen et al. | |
| 4,094,673 A | 6/1978 | Erickson et al. | |

(Continued)

FOREIGN PATENT DOCUMENTS

| | | |
|---|---|---|
| CA | 2712248 A1 | 9/2012 |
| EP | 0972853 A1 | 1/2000 |

(Continued)

OTHER PUBLICATIONS

Amendment in Response to Office Action mailed Jun. 6, 2014, from U.S. Appl. No. 14/033,043, filed Aug. 29, 2014, 12 pp.
(Continued)

*Primary Examiner* — Vera Katz
(74) *Attorney, Agent, or Firm* — Shumaker & Sieffert, P.A.

(57) ABSTRACT

An article may include a superalloy substrate and a calcia-magnesia-alumina-silicate (CMAS)-resistant thermal barrier coating (TBC) layer overlying the superalloy substrate. In some embodiments, the CMAS-resistant TBC layer includes between about 50 wt. % and about 90 wt. % of a TBC composition and between about 10 wt. % and about 50 wt. % of a CMAS-resistant composition. In some examples, the TBC composition includes at least one of yttria-stabilized zirconia, yttria-stabilized hafnia, zirconia stabilized with at least three rare earth oxides, or hafnia stabilized with at least three rare earth oxides. In some examples, the CMAS-resistant composition includes alumina, silica, and an oxide of at least one of Sc, Y, La, Ce, Pr, Nd, Pm, Sm, Eu, Gd, Yb, Dy, Ho, Er, Tm, Tb, or Lu.

12 Claims, 3 Drawing Sheets

(52) U.S. Cl.
CPC .. *Y10T428/12549* (2015.01); *Y10T 428/24967* (2015.01); *Y10T 428/26* (2015.01)

(56) References Cited

U.S. PATENT DOCUMENTS

| | | | |
|---|---|---|---|
| 4,386,968 A | 6/1983 | Hinkel et al. |
| 4,588,607 A | 5/1986 | Matarese et al. |
| 4,663,250 A | 5/1987 | Ong et al. |
| 4,914,794 A | 4/1990 | Strangman |
| 4,996,117 A | 2/1991 | Chu |
| 5,320,909 A | 6/1994 | Scharman et al. |
| 5,350,599 A | 9/1994 | Rigney et al. |
| 5,391,404 A | 2/1995 | Lee et al. |
| 5,496,644 A | 3/1996 | Lee et al. |
| 5,660,885 A | 8/1997 | Hasz et al. |
| 5,704,759 A | 1/1998 | Draskovich et al. |
| 5,714,202 A | 2/1998 | Lemelson et al. |
| 5,773,141 A | 6/1998 | Hasz et al. |
| 5,851,678 A | 12/1998 | Hasz et al. |
| 5,869,146 A | 2/1999 | McCluskey et al. |
| 5,871,820 A | 2/1999 | Hasz et al. |
| 5,876,850 A | 3/1999 | Skowronski et al. |
| 5,876,860 A | 3/1999 | Marijnissen et al. |
| 5,914,189 A | 6/1999 | Hasz et al. |
| 5,985,470 A | 11/1999 | Spitsberg et al. |
| 6,057,047 A | 5/2000 | Maloney |
| 6,261,643 B1 | 7/2001 | Hasz et al. |
| 6,284,325 B1 | 9/2001 | Eaton, Jr. et al. |
| 6,296,942 B1 | 10/2001 | Eaton et al. |
| 6,299,988 B1 | 10/2001 | Wang et al. |
| 6,312,763 B1 | 11/2001 | Eaton, Jr. et al. |
| 6,410,148 B1 | 6/2002 | Eaton, Jr. et al. |
| 6,465,090 B1 | 10/2002 | Stowell et al. |
| 6,468,648 B1 | 10/2002 | McCluskey et al. |
| 6,485,848 B1 | 11/2002 | Wang et al. |
| 6,562,409 B2 | 5/2003 | Koshkarian et al. |
| 6,613,445 B2 | 9/2003 | Sangeeta et al. |
| 6,617,036 B2 | 9/2003 | Eaton et al. |
| 6,627,323 B2 | 9/2003 | Nagaraj et al. |
| 6,720,038 B2 | 4/2004 | Darolia et al. |
| 6,723,674 B2 | 4/2004 | Wang et al. |
| 6,733,908 B1 | 5/2004 | Lee et al. |
| 6,759,151 B1 | 7/2004 | Lee |
| 6,787,195 B2 | 9/2004 | Wang et al. |
| 6,812,176 B1 | 11/2004 | Zhu et al. |
| 6,835,465 B2 | 12/2004 | Allen et al. |
| 6,869,508 B2 | 3/2005 | Darolia et al. |
| 6,887,528 B2 | 5/2005 | Lau et al. |
| 6,887,595 B1 | 5/2005 | Darolia et al. |
| 6,890,668 B2 | 5/2005 | Bruce et al. |
| 6,893,750 B2 | 5/2005 | Nagaraj et al. |
| 6,902,662 B2 | 6/2005 | Eaton et al. |
| 6,902,836 B2 | 6/2005 | Eaton et al. |
| 6,933,061 B2 | 8/2005 | Nagaraj et al. |
| 6,933,066 B2 | 8/2005 | Nagaraj et al. |
| 6,960,395 B2 * | 11/2005 | Spitsberg et al. ............ 428/632 |
| 6,969,555 B2 | 11/2005 | Meschter et al. |
| 7,008,674 B2 | 3/2006 | Nagaraj et al. |
| 7,063,894 B2 | 6/2006 | Sun et al. |
| 7,090,894 B2 | 8/2006 | Carper et al. |
| 7,186,466 B2 | 3/2007 | Zhu et al. |
| 7,226,668 B2 | 6/2007 | Nagaraj et al. |
| 7,354,651 B2 | 4/2008 | Hazel et al. |
| 7,364,802 B2 * | 4/2008 | Spitsberg et al. ............ 428/633 |
| 7,374,818 B2 | 5/2008 | Bhatia et al. |
| 7,374,825 B2 | 5/2008 | Hazel et al. |
| 7,442,444 B2 | 10/2008 | Hazel et al. |
| 7,449,254 B2 | 11/2008 | Spitsberg et al. |
| 7,544,394 B2 | 6/2009 | Boutwell et al. |
| 7,579,085 B2 | 8/2009 | Hazel |
| 7,595,114 B2 | 9/2009 | Meschter et al. |
| 7,666,512 B2 | 2/2010 | Bhatia et al. |
| 7,695,830 B2 | 4/2010 | Strangman et al. |
| 7,740,960 B1 | 6/2010 | Zhu et al. |
| 7,867,575 B2 | 1/2011 | Boutwell et al. |
| 7,879,411 B2 | 2/2011 | Hass et al. |
| 7,951,459 B2 | 5/2011 | Tang et al. |
| 7,968,217 B2 | 6/2011 | Sarrafi-Nour et al. |
| 8,084,086 B2 | 12/2011 | Hass et al. |
| 8,119,247 B2 | 2/2012 | Kirby et al. |
| 8,124,252 B2 | 2/2012 | Cybulsky et al. |
| 8,470,460 B2 | 6/2013 | Lee |
| 2001/0033630 A1 | 10/2001 | Hassoun et al. |
| 2002/0098391 A1 | 7/2002 | Tanaka et al. |
| 2003/0113553 A1 | 6/2003 | Sun et al. |
| 2003/0113559 A1 | 6/2003 | Eaton et al. |
| 2003/0118841 A1 | 6/2003 | Horne et al. |
| 2003/0138658 A1 | 7/2003 | Taylor et al. |
| 2004/0038085 A1 | 2/2004 | Litton et al. |
| 2004/0043244 A1 | 3/2004 | Bruce et al. |
| 2004/0115351 A1 | 6/2004 | Lau et al. |
| 2004/0151840 A1 | 8/2004 | Wang et al. |
| 2004/0170849 A1 | 9/2004 | Ackerman et al. |
| 2005/0003172 A1 | 1/2005 | Wheeler et al. |
| 2005/0126494 A1 | 6/2005 | Darolia et al. |
| 2005/0129511 A1 | 6/2005 | Allen |
| 2005/0129973 A1 | 6/2005 | Eaton et al. |
| 2005/0142392 A1 * | 6/2005 | Spitsberg et al. ............ 428/701 |
| 2005/0164027 A1 | 7/2005 | Lau et al. |
| 2005/0255648 A1 | 11/2005 | Bhatia et al. |
| 2006/0014029 A1 | 1/2006 | Saak et al. |
| 2006/0024513 A1 | 2/2006 | Schlichting et al. |
| 2006/0024527 A1 | 2/2006 | Schlichting et al. |
| 2006/0024528 A1 | 2/2006 | Strangman et al. |
| 2006/0029733 A1 | 2/2006 | Bhatia et al. |
| 2006/0046450 A1 | 3/2006 | Narendar et al. |
| 2006/0073361 A1 | 4/2006 | Fukudome et al. |
| 2006/0078750 A1 | 4/2006 | Zhu et al. |
| 2006/0115659 A1 | 6/2006 | Hazel et al. |
| 2006/0115661 A1 | 6/2006 | Hazel et al. |
| 2006/0154093 A1 | 7/2006 | Meschter et al. |
| 2006/0166018 A1 | 7/2006 | Spitsberg et al. |
| 2006/0210800 A1 | 9/2006 | Spitsberg et al. |
| 2006/0211241 A1 | 9/2006 | Govern et al. |
| 2006/0280952 A1 | 12/2006 | Hazel et al. |
| 2006/0280953 A1 | 12/2006 | Hazel et al. |
| 2006/0280954 A1 | 12/2006 | Spitsberg et al. |
| 2006/0280955 A1 | 12/2006 | Spitsberg et al. |
| 2006/0280963 A1 | 12/2006 | Hazel et al. |
| 2007/0014996 A1 | 1/2007 | Bhatia et al. |
| 2007/0071996 A1 | 3/2007 | Hazel et al. |
| 2007/0082131 A1 | 4/2007 | Doesberg et al. |
| 2007/0119713 A1 | 5/2007 | Hasz |
| 2007/0141367 A1 | 6/2007 | Darolia et al. |
| 2007/0160859 A1 | 7/2007 | Darolia et al. |
| 2007/0184204 A1 | 8/2007 | Balagopal et al. |
| 2007/0207330 A1 | 9/2007 | Tulyani et al. |
| 2007/0224411 A1 | 9/2007 | Hazel et al. |
| 2008/0124479 A1 | 5/2008 | Hazel et al. |
| 2008/0145674 A1 | 6/2008 | Darolia et al. |
| 2008/0206542 A1 | 8/2008 | Vance et al. |
| 2008/0274336 A1 | 11/2008 | Merrill et al. |
| 2009/0102008 A1 | 4/2009 | Kakehata |
| 2009/0110953 A1 | 4/2009 | Margolies |
| 2009/0162556 A1 | 6/2009 | Boutwell et al. |
| 2009/0162684 A1 | 6/2009 | Creech |
| 2009/0169914 A1 | 7/2009 | Fu et al. |
| 2009/0176059 A1 | 7/2009 | Namba et al. |
| 2009/0178413 A1 | 7/2009 | Lee |
| 2009/0184280 A1 | 7/2009 | Lee |
| 2009/0186237 A1 | 7/2009 | Lee |
| 2009/0324930 A1 | 12/2009 | Tulyani et al. |
| 2010/0080984 A1 | 4/2010 | Lee |
| 2010/0129636 A1 | 5/2010 | Cybulsky et al. |
| 2010/0136349 A1 | 6/2010 | Lee |
| 2010/0159150 A1 | 6/2010 | Kirby et al. |
| 2010/0159253 A1 | 6/2010 | Kirby et al. |
| 2011/0027467 A1 | 2/2011 | Kirby et al. |
| 2011/0027469 A1 | 2/2011 | Kirby et al. |
| 2011/0027470 A1 | 2/2011 | Kirby et al. |
| 2011/0027476 A1 | 2/2011 | Kirby et al. |
| 2011/0027484 A1 | 2/2011 | Kirby et al. |
| 2011/0027517 A1 | 2/2011 | Kirby et al. |
| 2011/0027557 A1 | 2/2011 | Kirby et al. |

(56) References Cited

U.S. PATENT DOCUMENTS

| | | |
|---|---|---|
| 2011/0027558 A1 | 2/2011 | Kirby et al. |
| 2011/0027559 A1 | 2/2011 | Kirby et al. |
| 2011/0027578 A1 | 2/2011 | Kirby et al. |
| 2011/0033630 A1 | 2/2011 | Naik et al. |
| 2011/0111310 A1 | 5/2011 | Pastula et al. |
| 2011/0256411 A1 | 10/2011 | Courcot et al. |
| 2012/0076943 A1 | 3/2012 | Kirby et al. |
| 2012/0077004 A1 | 3/2012 | Kirby et al. |
| 2012/0128879 A1 | 5/2012 | Cybulsky et al. |
| 2012/0244383 A1 | 9/2012 | Meschter et al. |
| 2013/0136915 A1 | 5/2013 | Naik |
| 2013/0189531 A1 | 7/2013 | Lee |
| 2013/0224457 A1 | 8/2013 | Lee |

FOREIGN PATENT DOCUMENTS

| | | |
|---|---|---|
| EP | 1335040 A2 | 8/2003 |
| EP | 1400611 A1 | 3/2004 |
| EP | 1479661 A2 | 11/2004 |
| EP | 1626039 A2 | 2/2006 |
| EP | 1666638 A1 | 6/2006 |
| EP | 1795515 A2 | 6/2007 |
| EP | 1806435 A2 | 7/2007 |
| EP | 1806435 A3 | 8/2007 |
| EP | 1829847 A2 | 9/2007 |
| EP | 1975258 A1 | 10/2008 |
| EP | 2108715 A2 | 10/2009 |
| EP | 2189504 A1 | 5/2010 |
| EP | 2192098 A2 | 6/2010 |
| EP | 2194164 A1 | 6/2010 |
| EP | 2208805 A1 | 7/2010 |
| EP | 2245096 A2 | 11/2010 |
| EP | 2287131 A2 | 2/2011 |
| EP | 2287138 A2 | 2/2011 |
| GB | 2319248 A | 5/1998 |
| SG | 163216 | 3/2013 |
| WO | WO 2006/023894 A2 | 3/2006 |
| WO | 2007098152 A2 | 8/2007 |
| WO | WO 2007/116547 | 10/2007 |
| WO | WO 2008/103163 A2 | 8/2008 |
| WO | WO 2008/109214 A2 | 9/2008 |
| WO | 2009091724 A1 | 7/2009 |
| WO | WO 2009/091721 A2 | 7/2009 |
| WO | WO 2010/039699 A3 | 4/2010 |
| WO | 2011123432 A1 | 10/2011 |
| WO | 2012012431 A1 | 1/2012 |
| WO | 2012129431 A1 | 9/2012 |

OTHER PUBLICATIONS

U.S. Appl. No. 61/318,567, by Kang N. Lee, filed Mar. 29, 2010.
U.S. Appl. No. 13/695,193, by Subhash K. Naik, filed Feb. 7, 2013.
Prosecution history of U.S. Appl. No. 12/016,589, dated Jul. 13, 2010, through Jan. 13, 2012, 93 pp.
Prosecution history of U.S. Appl. No. 12/016,649, dated May 31, 2011 through Dec. 26, 2012, 47 pp.
Prosecution history of U.S. Appl. No. 12/627,984, dated Oct. 1, 2012 through Feb. 22, 2013, 32 pp.
Shelby et al., "Rare earth aluminosilicate glasses," Journal of American Ceramic Society, vol. 73, No. 1, Jan. 1990, pp. 39-42.
Lee et al., "Rare earth silicate environmental barrier coatings for Si/C/SiC composites and Si3N4 ceramics," Journal of the European Ceramic Society 25, pp. 1705-1715, Jun. 2005.
International Preliminary Report on Patentability from corresponding international application No. PCT/US2011/044541, dated Jan. 31, 2013, 8 pp.
International Search Report and Written Opinion of from corresponding international application No. PCT/US2011/044541, dated Dec. 5, 2011, 12 pp.
Office Action from corresponding European patent application No. 11739246.4, dated Oct. 28, 2013, 5 pp.
Office Action from corresponding Canadian patent application No. 2,806,172, dated Nov. 25 2013, 2 pp.
U.S. Appl. No. 14/033,043, filed Sep. 20, 2013 entitled, "CMAS-Resistant Thermal Barrier Coatings Stress".
Communication from Examining Division of Counterpart European patent application 11739246.4, dated Feb. 28, 2014, 6 pp.
Response to Communication of Oct. 28, 2013 for counterpart European patent application 11739246.4, filed Feb. 12, 2014, 24 pages.
Office Action from U.S. Appl. No. 12/016,649, dated Jun. 20, 2013, 17 pp.
Anderson, et al., "Ultrasonic Measurement of the Kearns Texture Factors in Zircaloy, Zirconium, and Titanium," vol. 30A, Aug. 1999, Metallurgical and Materials Transactions, 8 pp.
Directed Vapor Technologies International, Inc., "Coating Technology for the Future", downloaded on Dec. 9, 2013 at http://www.directedvapor.com/Capabilities_Brochure.pdf, 7 pp.
Office Action and English Translation from counterpart Japanese application No. 2013-520810, mailed Apr. 1, 2014, 4 pp.
Office Action from U.S. Appl. No. 14/033,043, dated Jun. 6, 2014, 16 pp.
Response to Canadian Office Action dated Nov. 25, 2013, from Canadian counterpart application No. 2,806,172, filed May 13, 2014, 24 pp.
U.S. Appl. No. 14/004,075, by Kang N. Lee, filed Mar. 8, 2012.
Office Action from U.S. Appl. No. 13/638,277, dated Oct. 9, 2014, 15 pp.
Office Action from U.S. Appl. No. 14/033,043, dated Jan. 5, 2015, 15 pp.
Amendment in Response to Office Action mailed Oct. 9, 2014, from U.S. Appl. No. 13/638,277, filed Feb. 5, 2015, 14 pp.
Response to Final Office Action mailed Jan. 5, 2015, from U.S. Appl. No. 14/033,043, filed Mar. 5, 2015, 10 pp.
Final Office Action from U.S. Appl. No. 13/638,277, dated Jun. 1, 2015, 16 pp.
Response to Final Office Action mailed Jan. 5, 2015 and the Advisory Action mailed May 26, 2015, from U.S. Appl. No. 14/033,043, filed Jun. 25, 2015, 15 pp.
Office Action from U.S. Appl. No. 14/033,043, dated Jul. 8, 2015, 17 pp.
Respose to Final Office Action dated Jun. 1, 2015, from U.S. Appl. No. 13/638,277, filed Jul. 29, 2015, 13 pp.

\* cited by examiner

THERMAL BARRIER COATINGS INCLUDING CMAS-RESISTANT THERMAL BARRIER COATING LAYERS

CROSS REFERENCE TO RELATED APPLICATIONS

This application claims the benefit of U.S. Provisional Application No. 61/367,067, filed Jul. 23, 2010, the entire content of which is incorporated herein by reference.

TECHNICAL FIELD

The disclosure relates to thermal barrier coatings for high temperature mechanical systems.

BACKGROUND

Components of high-temperature mechanical systems, such as, for example, gas-turbine engines, must operate in severe environments. For example, the high-pressure turbine blades and vanes exposed to hot gases in commercial aeronautical engines typically experience metal surface temperatures of about 1000° C., with short-term peaks as high as 1100° C. Typical components of high-temperature mechanical systems include a Ni or Co-based superalloy substrate. In an attempt to reduce the temperatures experienced by the substrate, the substrate can be coated with a thermal barrier coating (TBC). The thermal barrier coating may include a thermally insulative ceramic topcoat which is bonded to the substrate by an underlying metallic bond layer. The TBC, usually applied either by air plasma spraying or electron beam physical vapor deposition, is most often a layer of yttria-stabilized zirconia (YSZ) with a thickness of about 100-500 μm. The properties of YSZ include low thermal conductivity, high oxygen permeability, and a relatively high coefficient of thermal expansion. The YSZ TBC is also typically made "strain tolerant" and the thermal conductivity further lowered by depositing a structure that contains numerous pores and/or pathways.

Economic and environmental concerns, i.e., the desire for improved efficiency and reduced emissions, continue to drive the development of advanced gas turbine engines with higher inlet temperatures. As the turbine inlet temperature continues to increase, there is a demand for a TBC with improved high temperature stability.

SUMMARY

In general, the disclosure is directed to a thermal barrier coating (TBC) which includes at least one CMAS-resistant TBC layer. CMAS is a calcia-magnesia-alumina-silicate deposit resulting from the ingestion of siliceous minerals (dust, sand, volcanic ashes, runway debris, and the like) with the intake of air in gas turbine engines.

The CMAS-resistant TBC layer may include a TBC composition in combination with a CMAS-resistant composition. In some embodiments, the TBC composition may include at least one of yttria-stabilized zirconia, yttria-stabilized hafnia, zirconia stabilized with at least three rare earth oxides, or hafnia stabilized with at least three rare earth oxides. The CMAS-resistant composition may include alumina, silica, and at least one rare earth oxide. Additionally or alternatively, the CMAS-resistant TBC layer may include tantalum oxide ($Ta_2O_5$), titanium dioxide ($TiO_2$), hafnium silicate ($HfSiO_4$), an alkali oxide, an alkali earth oxide, or combinations thereof.

In some embodiments, a TBC may include a single CMAS-resistant TBC layer, alone or in combination with a bond layer.

In other embodiments, a TBC includes at least one other layer in addition to the CMAS-resistant TBC layer, such as a layer that includes a TBC composition. The layer that includes the TBC composition may or may not provide additional resistance to CMAS to the TBC. In some embodiments, the TBC composition includes at least one of yttria-stabilized zirconia, yttria-stabilized hafnia, zirconia stabilized with at least three rare earth oxides, or hafnia stabilized with at least three rare earth oxides.

In some cases, the TBC may include an alternating layer structure with alternating TBC composition layers and CMAS-resistant TBC layers. For example, a TBC may include a first layer that includes a TBC composition, a CMAS-resistant TBC layer, and a second layer that includes a TBC composition. Such an alternating layer structure may be extended to any number of layers, and an outer layer of the TBC may include a layer including a TBC composition or a CMAS-resistant TBC layer.

In one aspect, the disclosure is directed to an article that includes a superalloy substrate and a CMAS-resistant TBC layer overlying the superalloy substrate. According to this aspect of the disclosure, the CMAS-resistant TBC layer includes between about 50 wt. % and about 90 wt. % of a TBC composition and between about 10 wt. % and about 50 wt. % of a CMAS-resistant composition. In some embodiments, the TBC composition includes at least one of yttria-stabilized zirconia, yttria-stabilized hafnia, zirconia stabilized with at least three rare earth oxides, or hafnia stabilized with at least three rare earth oxides. In some embodiments, the CMAS-resistant composition includes alumina, silica, and an oxide of at least one of Sc, Y, La, Ce, Pr, Nd, Pm, Sm, Eu, Gd, Yb, Dy, Ho, Er, Tm, Tb, or Lu.

In another aspect, the disclosure is directed to an article that includes a superalloy substrate and a TBC overlying the superalloy substrate. According to this aspect of the disclosure, the TBC includes a layer comprising a first TBC composition overlying the substrate and a CMAS-resistant TBC layer overlying the layer including the first TBC composition. In some embodiments, the first TBC composition includes at least one of yttria-stabilized zirconia, yttria-stabilized hafnia, zirconia stabilized with at least three rare earth oxides, or hafnia stabilized with at least three rare earth oxides. According to this aspect of the disclosure, the CMAS-resistant TBC layer includes a second TBC composition and a CMAS-resistant composition. In some embodiments, the second TBC composition includes at least one of yttria-stabilized zirconia, yttria-stabilized hafnia, zirconia stabilized with at least three rare earth oxides, or hafnia stabilized with at least three rare earth oxides. In some embodiments, the CMAS-resistant composition includes alumina, silica, and an oxide of at least one of Sc, Y, La, Ce, Pr, Nd, Pm, Sm, Eu, Gd, Yb, Dy, Ho, Er, Tm, Tb, or Lu.

In a further aspect, the disclosure is directed to an article that includes a superalloy substrate, a plurality of layers comprising a first TBC composition overlying the superalloy substrate, and a plurality of CMAS-resistant TBC layers overlying the superalloy substrate. According to this aspect of the disclosure, the first TBC composition includes at least one of yttria-stabilized zirconia, yttria-stabilized hafnia, zirconia stabilized with at least three rare earth oxides, or hafnia stabilized with at least three rare earth oxides. In some embodiments, the plurality of CMAS-resistant TBC layers include a second TBC composition and a CMAS-resistant composition. The second TBC composition may include at least one of yttria-stabilized zirconia, yttria-stabilized hafnia, zirconia stabilized with at least three rare earth oxides, or hafnia stabilized with at least three rare earth oxides. The CMAS-resistant composition may include alumina, silica, and an oxide of at least one of Sc, Y, La, Ce, Pr, Nd, Pm, Sm, Eu, Gd, Yb, Dy, Ho, Er, Tm, Tb, or Lu. Additionally, according to this aspect of the disclosure, respective ones of the plurality of CMAS-resistant TBC layers alternate with respective ones of the plurality of layers comprising the TBC composition.

In another aspect, the disclosure is directed to a method that includes forming a CMAS-resistant TBC layer over a superalloy substrate. According to this aspect of the disclose, the CMAS-resistant layer includes between about 50 wt. % and about 90 wt. % of a TBC composition and between about 10 wt. % and about 50 wt. % of a CMAS-resistant composition. In some examples, the TBC composition includes at least one of yttria-stabilized zirconia, yttria-stabilized hafnia, zirconia stabilized with at least three rare earth oxides, or hafnia stabilized with at least three rare earth oxides. In some examples, the CMAS-resistant composition comprises alumina, silica, and an oxide of at least one of Sc, Y, La, Ce, Pr, Nd, Pm, Sm, Eu, Gd, Yb, Dy, Ho, Er, Tm, Tb, or Lu.

In a further aspect, the disclosure is directed to a method that includes forming a layer comprising a first TBC composition over a superalloy substrate and forming a CMAS-resistant TBC layer over the layer comprising the first TBC composition. According to this aspect of the disclosure, the first TBC composition comprises at least one of yttria-stabilized zirconia, yttria-stabilized hafnia, zirconia stabilized with at least three rare earth oxides, or hafnia stabilized with at least three rare earth oxides. Additionally, according to this aspect of the disclosure, the CMAS-resistant TBC layer comprises a second TBC composition and a CMAS-resistant composition. In some embodiments, the second TBC composition comprises at least one of yttria-stabilized zirconia, yttria-stabilized hafnia, zirconia stabilized with at least three rare earth oxides, or hafnia stabilized with at least three rare earth oxides. In some embodiments, the CMAS-resistant composition comprises alumina, silica, and an oxide of at least one of Sc, Y, La, Ce, Pr, Nd, Pm, Sm, Eu, Gd, Yb, Dy, Ho, Er, Tm, Tb, or Lu.

The details of one or more embodiments are set forth in the accompanying drawings and the description below. Other features, objects, and advantages of the disclosure will be apparent from the description and drawings, and from the claims.

DETAILED DESCRIPTION

Figure 1:
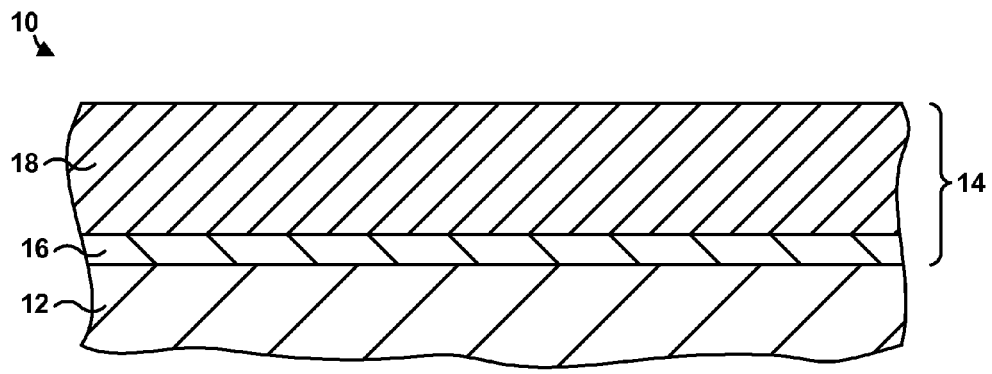
FIG. 1 is a conceptual cross-sectional diagram illustrating an example article including a substrate, a bond layer overlying the substrate, and a CMAS-resistant TBC layer overlying the bond layer.

In general, the disclosure is directed to a thermal barrier coating (TBC) which includes at least one CMAS-resistant TBC layer. CMAS is a calcia-magnesia-alumina-silicate deposit resulting from the ingestion of siliceous minerals (dust, sand, volcanic ashes, runway debris, and the like) with the intake of air in gas turbine engines.

Increased operating efficiency (e.g., fuel efficiency) is continually sought after to reduce operating costs of gas turbine engines. Operating the gas turbine engines at higher temperatures is one technique for improving operating efficiency of the engine. As turbine inlet temperatures continue to increase, new barrier coatings, such as new TBCs, are required that are able to withstand the temperatures to which the components of the gas turbine engine are exposed. TBCs may be deposited as a porous or columnar structure, which increases the stress tolerance and reduces the thermal conductivity of the TBC compared to a non-porous TBC. However, this porous TBC structure may be susceptible to damage.

Higher turbine inlet temperatures may lead to damage of a porous TBC including, for example, yttria-stabilized zirconia, when CMAS forms from the ingestion of siliceous minerals (dust, sand, volcanic ashes, runway debris, and the like) with the intake of air in gas turbine engines. Some CMAS deposits have a melting temperature of about 1200° C. to about 1250° C. (about 2200° F. to about 2300° F.). Advanced gas turbine engines run at TBC surface temperatures above the CMAS melting temperature, so the CMAS may be molten on the surface of the TBC, which allows the CMAS to infiltrate the pores of the porous TBC. When the component coated with the TBC is cooled below the CMAS melting temperature, the CMAS solidifies, which exerts a strain on the TBC and may reduce the useful life of the TBC. The filling of the pores of the TBC with molten CMAS may also increase the thermal conductivity of the TBC, which is detrimental to the TBC performance and may cause the substrate of the component to be exposed to increased temperatures.

Additionally, in embodiments in which a TBC includes yttria-stabilized zirconia, the molten CMAS may dissolve the TBC along grain boundaries of the yttria-stabilized zirconia, and, depending on the melt chemistry, zirconia with lower yttria content may precipitate out of the molten solution. This zirconia with lower yttira content may decrease the effectiveness of the TBC compared to a TBC including zirconia and a higher yttria content.

In accordance with embodiments of the disclosure, a TBC may include a CMAS-resistant TBC layer which includes a TBC composition in combination with a CMAS-resistant composition. In some embodiments, the TBC composition may include at least one of yttria-stabilized zirconia, yttria-stabilized hafnia, zirconia stabilized with at least three rare earth oxides, or hafnia stabilized with at least three rare earth oxides. The CMAS-resistant composition may include alumina, silica, and at least one rare earth oxide. In some embodiments, the CMAS-resistant TBC layer further includes at least one of tantalum oxide ($Ta_2O_5$), titanium dioxide ($TiO_2$), hafnium silicate ($HfSiO_4$), an alkali oxide, or an alkali earth oxide.

The CMAS-resistant TBC layer may provide to the TBC increased resistance to the detrimental effects of CMAS. In some embodiments, at least one component in the CMAS-resistant TBC layer reacts with constituents of CMAS to form a solid or highly viscous reaction product, which reduces or substantially eliminates infiltration of pores or cracks of the CMAS-resistant TBC layer by molten CMAS. In some examples, the product of the reaction between CMAS and a component in the CMAS-resistant TBC layer may form a reaction layer on a surface of the CMAS-resistant TBC layer, and the reaction layer may serve to retard infiltration of pores or cracks in the CMAS-resistant TBC layer by molten CMAS.

Additionally or alternatively, the CMAS-resistant TBC layer may be formed as a substantially nonporous layer which physically inhibits or prevents CMAS from infiltrating pores or cracks of an underlying layer, such as a layer including a TBC composition.

In some embodiments, a TBC may include another layer in addition to the CMAS-resistant TBC layer. For example, a TBC may include a layer formed of a TBC composition overlying a substrate and a CMAS-resistant TBC layer overlying the layer including the TBC composition. As another example, a TBC may include a plurality of CMAS-resistant TBC layers alternating with a plurality of layers including a TBC composition. In some embodiments, the TBC that includes more than one layer may contribute to thermal insulation provided by the TBC to a substrate on which the TBC is deposited. For example, a TBC that includes multiple layers may have interfaces between two different materials (e.g., a CMAS-resistant TBC layer and a layer including a TBC composition), and these interfaces may contribute to reduced thermal conductivity compared to a TBC that includes only a single layer.

While not wishing to be bound by theory, interfaces between two different layers may reduce a thermal conductivity of a coating because the interfaces between the layers provide phonon scattering points. Accordingly in some embodiments, the CMAS-resistant TBC layer provides protection from CMAS and, additionally, reduces thermal conductivity of the TBC compared to a coating which does not include a CMAS-resistant TBC layer.

FIG. 1 shows a cross-sectional view of an example of an article 10 used in a high-temperature mechanical system. The article 10 includes a TBC 14 applied to a substrate 12. TBC 14 includes a bond layer 16 overlying substrate 12 and a CMAS-resistant TBC layer 18 overlying bond layer 16.

Substrate 12 is a component of a high temperature mechanical system, such as, for example, a gas turbine engine or the like. In some embodiments, substrate 12 includes a superalloy. A substrate 12 formed of a superalloy may include an alloy based on Ni, Co, Ni/Fe, or the like. The substrate 12 formed of a superalloy may include other additive elements to alter its mechanical properties, such as toughness, hardness, temperature stability, corrosion resistance, oxidation resistance, and the like, as is well known in the art. Any useful superalloy may be utilized in substrate 12, including, for example, those available from Martin-Marietta Corp., Bethesda, Md., under the trade designation MAR-M247; those available from Cannon-Muskegon Corp., Muskegon, Mich., under the trade designations CMSX-4 and CMSX-10; and the like.

As shown in FIG. 1, article 10 may include a bond layer 16 formed on substrate 12. Although not illustrated in FIG. 1, in other embodiments, article 10 may not include a bond layer 16. Bond layer 16 may improve adhesion between substrate 12 and the layer overlying bond layer 16 (e.g., CMAS-resistant TBC layer 18 in FIG. 1). Bond layer 16 may include any useful material that improves adhesion between substrate 12 and an overlying layer.

For example, when substrate 12 is a superalloy, bond layer 16 may include an alloy, such as an MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-$Ni_3Al$ nickel aluminide alloy (either unmodified or modified by Pt, Cr, Hf, Zr, Y, Si, and combination thereof), or the like.

The composition and resulting phase constitution of bond layer 16 may be selected based on a number of considerations, including the chemical composition and phase constitution of substrate 12 and the layer overlying bond layer 16 (in FIG. 1, CMAS-resistant TBC layer 18). For example, when substrate 12 includes a superalloy with a γ-Ni+γ'-$Ni_3Al$ phase constitution, bond layer 16 may include a γ-Ni+γ'-$Ni_3Al$ phase constitution to better match the coefficient of thermal expansion of the superalloy substrate 12. This may increase the mechanical stability (adhesion) between bond layer 16 and substrate 12.

In some embodiments, article 10 does not include a bond layer 16. For example, in some embodiments, CMAS-resistant TBC layer 18 is formed directly on substrate 12. Article 10 may not include a bond layer 16 when CMAS-resistant TBC layer 18 and substrate 12 are sufficiently chemically and/or mechanically compatible. For example, in embodiments where CMAS-resistant TBC layer 18 and substrate 12 adhere sufficiently strongly to each other, article 10 may not include bond layer 16. Additionally, in embodiments where the coefficients of thermal expansion of substrate 12 and CMAS-resistant TBC layer 18 are sufficiently similar, article 10 may not include bond layer 16. In this way, CMAS-resistant TBC layer 18 may be formed on bond layer 16 or may be formed on substrate 12. As used herein, the term "formed over" encompasses embodiments in which a first layer is formed directly on a second layer and embodiments in which the first layer is formed over the second layer, with one or more intermediate layers between the first and second layer. For example, the term "CMAS-resistant TBC layer 18 is formed over substrate 12" encompasses the following embodiments: CMAS-resistant TBC layer 18 is formed directly on substrate 12; CMAS-resistant TBC layer 18 is formed on bond layer 16, which is formed on substrate 12; and CMAS-resistant TBC layer 18 is formed on another intermediate layer between substrate 12 and CMAS-resistant TBC layer 18 (in addition to or instead of bond layer 16). Similarly, as use herein, the term "overlying" is analogous to "formed over," i.e., a first layer overlying a second layer may be formed directly on the second layer or may be formed on another layer which overlies the second layer.

TBC 14 further includes CMAS-resistant TBC layer 18 overlying bond layer 16. CMAS-resistant TBC layer 18 may provide at least one of thermal protection (i.e., thermal insulation) and resistance to CMAS attack. CMAS-resistant TBC layer 18 generally includes a TBC composition and a CMAS-resistant composition. The TBC composition may include, for example, at least one material which is selected to provide thermal insulation to substrate 12. In some embodiments, the TBC composition includes yttria and/or hafnia, alone or in combination with at least one other element or compound. For example, the TBC composition may include yttria and/or hafnia in combination with at least one rare earth oxide. Suitable rare earth oxides include oxides of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium).

In some embodiments, the TBC composition includes yttria-stabilized zirconia and/or yttria-stabilized hafnia. In some cases, the yttria-stabilized zirconia or hafnia may include between about 7 wt. % yttria and about 8 wt. % yttria, and a balance zirconia and/or hafnia.

In some embodiments, the TBC composition includes hafnia and/or zirconia stabilized by at least three rare earth oxides. The TBC composition may include any combination of rare earth oxides in any relative amount.

In some examples, the TBC composition includes a base oxide, a primary dopant, a first co-dopant, and a second co-dopant. The base oxide may include at least one of zirconia or hafnia. The primary dopant, which is present in an amount greater than either the first co-dopant or the second co-dopant (but not necessarily a greater amount that the total of the first co-dopant and the second co-dopant), may include ytterbia. The first co-dopant may include samaria, and the second co-dopant may include at least one of lutetia, scandia, ceria, gadolinia, neodymia, or europia.

In some embodiments, a TBC composition including a base oxide, a primary dopant, a first co-dopant, and a second co-dopant may have a desirably low thermal conductivity. While not wishing to be bound by theory, the dopants may have different ionic radii or crystalline lattice structures than the base oxide ions. Inclusion of such dopants may introduce lattice imperfections into the crystal structure of CMAS-resistant TBC layer 18. For the purposes of this discussion, lattice imperfections may be broadly divided into two categories, point defects and larger defects. Point defects, such as substitutional defects, interstitial defects, void defects, or the like, may scatter high frequency phonons, while larger defects, such as grain boundaries of crystals that are smaller than about 100 nm, may scatter lower frequency phonons. In either case, phonon scattering decreases thermal conductivity of CMAS-resistant TBC layer 18.

Additionally or alternatively, in some embodiments, inclusion of certain rare earth elements or combinations of rare earth elements in CMAS-resistant TBC layer 18 may also decrease the extent to which the CMAS-resistant TBC layer 18 sinters at a given temperature. For example, incorporating rare earth elements with a larger ionic radius than yttrium can decrease the amount of sintering at a given temperature compared to a TBC layer including yttria-stabilized zirconia. While not wishing to be bound by any theory, a larger ionic radius can lead to a lower diffusion coefficient (of the ion) at a given temperature. As sintering is primarily a diffusion-related process, a lower diffusion coefficient lowers the amount of sintering at a given temperature.

Minimizing or eliminating sintering may improve stability of the thermal conductivity of CMAS-resistant TBC layer 18 over the service life of article 10. In some examples, thermal conductivity of CMAS-resistant TBC layer 18 may be lowered by depositing the CMAS-resistant TBC layer 18 as a porous structure. The porosity of CMAS-resistant TBC layer 18 reduces the thermal conductivity compared to a nonporous TBC by reducing the area through which heat is conducted and by providing a large refractive index difference between the pores and the material from which CMAS-resistant TBC layer 18 is made, which can reduce heat transfer by radiation. Sintering reduces the porosity of the structure, and thus may increase the thermal conductivity (via both radiation and conduction) of CMAS-resistant TBC layer 18. Thus, preserving porosity (i.e., reducing sintering) of CMAS-resistant TBC layer 18 over repeated thermal cycles may help maintain the thermal conductivity of CMAS-resistant TBC layer 18 at or near the level of CMAS-resistant TBC layer 18 as originally applied.

In some embodiments, a TBC composition including a base oxide, a primary dopant, a first co-dopant, and a second co-dopant may include a composition selected to provide a metastable tetragonal (t') phase constitution, a cubic (c) phase constitution, a mixture of t' and c phase constitution, or a compound phase constitution.

As described above, the primary dopant may include ytterbia. In some example, the primary dopant may consist essentially of ytterbia. As used herein to "consist essentially of" means to consist of the listed element(s) or compound(s), while allowing the inclusion of impurities present in small amounts such that the impurities do not substantially affect the properties of the listed element or compound. For example, the purification of many rare earth elements is difficult, and thus the nominal rare earth element may include small amounts of other rare earth elements. This mixture is intended to be covered by the language "consist essentially of." In some examples, the TBC composition includes between about 2 mol. % and about 40 mol. % ytterbia. In other examples, the TBC composition includes between about 2 mol. % and about 20 mol. % ytterbia, or between about 2 mol. % and about 10 mol. % ytterbia.

The TBC composition also may include a first co-dopant, and the first co-dopant may include or consist essentially of samaria. In some examples, the TBC composition includes between about 0.1 mol. % and about 20 mol. % samaria. In other examples, the TBC composition includes between about 0.5 mol. % and about 10 mol. % samaria, or between about 0.5 mol. % and about 5 mol. % samaria.

The TBC composition also may include a second co-dopant, and the second co-dopant may include at least one of lutetia, scandia, ceria, gadolinia, neodymia, or europia. In some examples, the TBC composition includes between about 0.1 mol. % and about 20 mol. % of the second co-dopant. In other examples, the TBC composition includes between about 0.5 mol. % and about 10 mol. % of the second co-dopant, or between about 0.5 mol. % and about 5 mol. % of the second co-dopant.

The overall constitution of the TBC composition may be selected to provide a desired phase constitution. As described above, accessible phase constitutions include metastable tetragonal, cubic, and compound, which include $RE_2O_3$—$ZrO_2$ (and/or $HfO_2$) compounds, such as $RE_2Zr_2O_7$ and $RE_2Hf_2O_7$ (where RE is a rare earth element).

In some embodiments, to achieve a $RE_2O_3$—$ZrO_2$ (and/or $HfO_2$) compound phase constitution, the TBC composition may include between about 20 mol. % and about 40 mol. % primary dopant, between about 10 mol. % and about 20 mol. % first co-dopant, between about 10 mol. % and about 20 mol. % second co-dopant, and a balance base oxide and any impurities present.

In some embodiments, to achieve a cubic phase constitution, the TBC composition includes between about 4 mol. % and about 10 mol. % primary dopant, between about 1 mol. % and about 5 mol. % first co-dopant, between about 1 mol. % and about 5 mol. % second co-dopant, and a balance base oxide and any impurities present.

In some embodiments, to achieve a metastable tetragonal phase constitution, the TBC composition includes between about 2 mol. % and about 5 mol. % primary dopant, between about 0.5 mol. % and about 3 mol. % first co-dopant, between about 0.5 mol. % and about 3 mol. % second co-dopant, and a balance base oxide and any impurities present.

As described above, CMAS-resistant TBC layer further includes a CMAS-resistant composition. The CMAS-resistant composition may include, for example, alumina, silica, and at least one rare earth oxide. The at least one rare earth oxide may include an oxide of at least one of Lu, Yb, Tm, Er, Ho, Dy, Tb, Gd, Eu, Sm, Pm, Nd, Pr, Ce, La, Y, or Sc. In some embodiments, at least one rare earth oxide contained in the CMAS-resistant composition may be the same as at least one rare earth oxide contained in the TBC composition. In other embodiments, the TBC composition includes at least one rare earth oxide which is different from at least one rare earth oxide in the CMAS-resistant composition.

In some embodiments, the CMAS-resistant composition may include between about 1 molar percent (mol. %) and about 99 mol. % of at least one rare earth oxide and between about 1 mol. % and about 99 mol. % alumina and silica. In other embodiments, the CMAS-resistant composition may include between about 10 mol. % and about 90 mol. % of at least one rare earth oxide and between about 10 mol. % and about 90 mol. % alumina and silica. In other embodiments, the CMAS-resistant composition may include between about 20 mol. % and about 80 mol. % of at least one rare earth oxide and between about 20 mol. % and about 80 mol. % alumina and silica.

In some embodiments, the CMAS-resistant composition optionally includes at least one of $TiO_2$, $Ta_2O_5$, $HfSiO_4$, an alkali oxide, or an alkali earth oxide. The additive components may be added to the CMAS-resistant composition to modify one or more desired properties of CMAS-resistant TBC layer 18. For example, the additive components may increase or decrease the reaction rate of CMAS-resistant TBC layer 18 with CMAS, may modify the viscosity of the reaction product from the reaction of CMAS and CMAS-resistant TBC layer 18, may increase adhesion of CMAS-resistant TBC layer 18 to an adjacent layer, such as bond layer 16, may increase or decrease the chemical stability of CMAS-resistant TBC layer 18, or the like.

CMAS-resistant TBC layer 18 may include a mixture or alloy of the TBC composition and the CMAS-resistant composition. In general, CMAS-resistant TBC layer 18 may include between about 1 wt. % and about 99 wt. % TBC composition and between about 1 wt. % and about 99 wt. % CMAS-resistant composition. In some embodiments, CMAS-resistant TBC layer 18 includes between about 50 wt. % and about 90 wt. % TBC composition and between about 10 wt. % and about 50 wt. % CMAS-resistant composition. In other embodiments, CMAS-resistant TBC layer 18 includes between about 50 wt. % and about 70 wt. % TBC composition and between about 30 wt. % and about 50 wt. % CMAS-resistant composition.

Additionally, CMAS-resistant TBC layer 18 may include a substantially dense microstructure, a porous microstructure, or a columnar microstructure. CMAS-resistant TBC layer 18 may be deposited by, for example, plasma spraying, physical vapor deposition (PVD), chemical vapor deposition (CVD), or a slurry deposition process. One type of PVD which may be used to deposit CMAS-resistant TBC layer 18 is electron beam-physical vapor deposition (EB-PVD). One type of EB-PVD which may be used to deposit CMAS-resistant TBC layer 18 is directed vapor deposition (DVD). In DVD, an energy source generates an electron beam which vaporizes a portion of a target material including components to be deposited in CMAS-resistant TBC layer 18. The vaporized material is then directed to substrate 12 using a transonic gas stream. This may allow greater deposition efficiency than EB-PVD, and may also allow non-line-of-sight deposition. In some embodiments, CMAS-resistant TBC layer 18 includes a columnar microstructure, and is deposited using EB-PVD or DVD.

In some embodiments, CMAS-resistant TBC layer 18 may be deposited using plasma deposition. In cases in which CMAS-resistant TBC layer 18 includes a porous microstructure, the material which forms CMAS-resistant TBC layer 18 may be co-deposited with a sacrificial material, such as a polyester, which is removed after deposition of CMAS-resistant TBC layer 18 to form pores.

CMAS-resistant TBC layer 18 may generally include any thickness. In some examples, CMAS-resistant TBC layer 18 includes a thickness of between about 0.5 mil and about 20 mils (1 mil equals 0.001 inch).

As described above, in some examples, components in CMAS-resistant TBC layer 18 may react with CMAS that contacts layer 18 to form a solid or highly viscous reaction product. The reaction product may have a melting temperature significantly higher than CMAS (e.g., higher than about 1200-1250° C.). A solid or highly viscous reaction product is desired because the CMAS-resistant TBC layer 18 is consumed as it reacts with CMAS. If, for example, the reaction product of CMAS-resistant TBC layer 18 and CMAS was a relatively low viscosity liquid, the low viscosity liquid could infiltrate further within pores or cracks of a porous or columnar CMAS-resistant TBC layer 18, which is the very occurrence the CMAS-resistant TBC layer 18 is designed to prevent.

If the reaction product is a solid or highly viscous, however, a reaction layer may form on or near the surface of CMAS-resistant TBC layer 18 (e.g., within pores or cracks in CMAS-resistant TBC layer 18 near the outer surface of the layer 18), which may lower the reaction rate of the CMAS with CMAS-resistant TBC layer 18. That is, once a solid or highly viscous reaction layer forms on or near the surface of CMAS-resistant TBC layer 18, the reaction between CMAS-resistant TBC layer 18 and CMAS may slow, because any further reaction will require the diffusion of CMAS through the reaction layer to encounter the CMAS-resistant TBC layer 18, or diffusion of a component of CMAS-resistant TBC layer 18 through the reaction layer to encounter the CMAS. In either case, the diffusion of either CMAS or the component of CMAS-resistant TBC layer 18 is expected to be the limiting step in the reaction once a solid or highly viscous reaction layer is formed on the surface of CMAS-resistant TBC layer 18, because diffusion is expected to be the slowest process.

Figure 2:
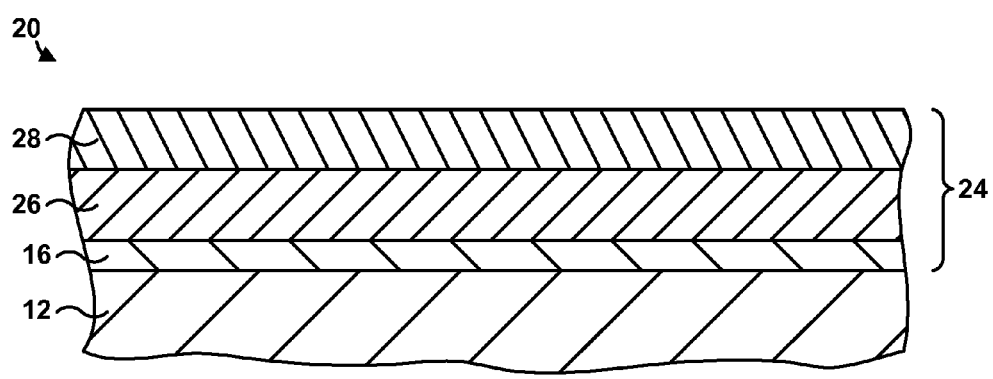
FIG. 2 is a conceptual cross-sectional illustrating an example article including a substrate, a bond layer overlying the substrate, a layer including a TBC composition overlying the bond layer, and a CMAS-resistant TBC layer overlying the layer including the TBC composition.

FIG. 2 is a cross-sectional diagram illustrating an example of another article coated with a TBC including a CMAS-resistant TBC layer. In contrast to FIG. 1, which shows a TBC 14 including a single CMAS-resistant TBC layer 18 formed on a bond layer 16, the article 20 illustrated in FIG. 2 includes a multilayer TBC 24. Multilayer TBC 24 includes a bond layer 16 overlying substrate 12, a layer including a TBC composition 26 overlying bond layer 16, and a CMAS-resistant TBC layer 28 overlying the layer including the TBC composition 26.

Substrate 12 and bond layer 16 may include similar compositions as described above with respect to FIG. 1. For example, substrate 12 may include a superalloy based on Ni, Co, Ni/Fe, or the like, and bond layer 16 may include an alloy which improves adhesion between substrate 12 and the layer including the TBC composition 26. As examples, bond layer 16 may include an MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-Ni₃Al nickel aluminide alloy (either unmodified or modified by Pt, Cr, Hf, Zr, Y, Si, and combination thereof), or the like.

Although FIG. 2 illustrates multilayer TBC 24 as including bond layer 16, in other examples, a multilayer TBC 24 may not include a bond layer 16, and the layer including the TBC composition 26 may be formed directly on substrate 12. Multilayer TBC 24 may not include a bond layer 16 when the layer including the TBC composition 26 and substrate 12 are sufficiently chemically and/or mechanically compatible. For example, in embodiments where the layer including the TBC composition 26 and substrate 12 adhere sufficiently strongly to each other, multilayer TBC 24 may not include bond layer 16. Additionally, in embodiments where the coefficients of thermal expansion of substrate 12 and the layer including the TBC composition 26 are sufficiently similar, multilayer TBC 24 may not include bond coat 16.

Multilayer TBC 24 further includes the layer including the TBC composition 26. The TBC composition in the layer including the TBC composition 26 may include, for example, at least one material which is selected to provide thermal insulation to substrate 12. In some embodiments, the TBC composition includes yttria and/or hafnia, alone or in combination with at least one other element or compound. For example, the TBC composition may include yttria and/or hafnia in combination with at least one rare earth oxide. Suitable rare earth oxides include oxides of Lu, Yb, Tm, Er, Ho, Dy, Tb, Gd, Eu, Sm, Pm, Nd, Pr, Ce, La, Y, or Sc.

In some embodiments, the TBC composition includes yttria-stabilized zirconia and/or yttria-stabilized hafnia. In some cases, the yttria-stabilized zirconia or hafnia may include between about 7 wt. % yttria and about 8 wt. % yttria, and a balance zirconia and/or hafnia.

In some embodiments, the TBC composition includes hafnia and/or zirconia stabilized by at least three rare earth oxides. The TBC composition may include any combination of rare earth oxides in any relative amount.

In some examples, the TBC composition includes a base oxide, a primary dopant, a first co-dopant, and a second co-dopant. The base oxide may include at least one of zirconia or hafnia. The primary dopant, which is present in an amount greater than either the first co-dopant or the second co-dopant (but not necessarily a greater amount that the total of the first co-dopant and the second co-dopant), may include ytterbia. The first co-dopant may include samaria, and the second co-dopant may include at least one of lutetia, scandia, ceria, gadolinia, neodymia, or europia.

In some embodiments, a TBC composition including a base oxide, a primary dopant, a first co-dopant, and a second co-dopant may have a desirably low thermal conductivity. While not wishing to be bound by theory, the dopants may have different ionic radii or crystalline lattice structures than the base oxide ions. Inclusion of such dopants may introduce lattice imperfections into the crystal structure of the layer including the TBC composition 26. For the purposes of this discussion, lattice imperfections may be broadly divided into two categories, point defects and larger defects. Point defects, such as substitutional defects, interstitial defects, void defects, or the like, may scatter high frequency phonons, while larger defects, such as grain boundaries of crystals that are smaller than about 100 nm, may scatter lower frequency phonons. In either case, phonon scattering decreases thermal conductivity of the layer including the TBC composition 26.

Additionally or alternatively, in some embodiments, inclusion of certain rare earth elements or combinations of rare earth elements in the layer including the TBC composition 26 may also decrease the extent to which the layer including the TBC composition 26 sinters at a given temperature. For example, incorporating rare earth elements with a larger ionic radius than yttrium can decrease the amount of sintering at a given temperature compared to a TBC layer including yttria-stabilized zirconia. While not wishing to be bound by any theory, a larger ionic radius can lead to a lower diffusion coefficient (of the ion) at a given temperature. As sintering is primarily a diffusion-related process, a lower diffusion coefficient lowers the amount of sintering at a given temperature.

Minimizing or eliminating sintering may improve stability of the thermal conductivity of the layer including the TBC composition 26 over the service life of article 10. In some examples, thermal conductivity of the layer including the TBC composition 26 may be lowered by depositing the layer including the TBC composition 26 as a porous structure. The porosity of the layer including the TBC composition 26 reduces the thermal conductivity compared to a nonporous TBC by reducing the area through which heat is conducted and by providing a large refractive index difference between the pores and the material from which the layer including the TBC composition 26 is made, which can reduce heat transfer by radiation. Sintering reduces the porosity of the structure, and thus may increase the thermal conductivity (via both radiation and conduction) of the layer including the TBC composition 26. Thus, preserving porosity (i.e., reducing sintering) of the layer including the TBC composition 26 over repeated thermal cycles may help maintain the thermal conductivity of the layer including the TBC composition 26 at or near the level of CMAS-resistant TBC layer 18 as originally applied.

In some embodiments, a TBC composition including a base oxide, a primary dopant, a first co-dopant, and a second co-dopant may include a composition selected to provide a metastable tetragonal (t') phase constitution, a cubic (c) phase constitution, a mixture of t' and c phase constitution, or a compound phase constitution.

As described above, the primary dopant may include ytterbia. In some example, the primary dopant may consist essentially of ytterbia. As used herein to "consist essentially of" means to consist of the listed element(s) or compound(s), while allowing the inclusion of impurities present in small amounts such that the impurities do not substantially affect the properties of the listed element or compound. For example, the purification of many rare earth elements is difficult, and thus the nominal rare earth element may include small amounts of other rare earth elements. This mixture is intended to be covered by the language "consist essentially of." In some examples, the TBC composition includes between about 2 mol. % and about 40 mol. % ytterbia. In other examples, the TBC composition includes between about 2 mol. % and about 20 mol. % ytterbia, or between about 2 mol. % and about 10 mol. % ytterbia.

The TBC composition also may include a first co-dopant, and the first co-dopant may include or consist essentially of samaria. In some examples, the TBC composition includes between about 0.1 mol. % and about 20 mol. % samaria. In other examples, the TBC composition includes between about 0.5 mol. % and about 10 mol. % samaria, or between about 0.5 mol. % and about 5 mol. % samaria.

The TBC composition also may include a second co-dopant, and the second co-dopant may include at least one of lutetia, scandia, ceria, gadolinia, neodymia, or europia. In some examples, the TBC composition includes between about 0.1 mol. % and about 20 mol. % of the second co-dopant. In other examples, the TBC composition includes between about 0.5 mol. % and about 10 mol. % of the second co-dopant, or between about 0.5 mol. % and about 5 mol. % of the second co-dopant.

The overall constitution of the TBC composition may be selected to provide a desired phase constitution. As described above, accessible phase constitutions include metastable tetragonal, cubic, and compound, which include $RE_2O_3$—$ZrO_2$ (and/or $HfO_2$) compounds, such as $RE_2Zr_2O_7$ and $RE_2Hf_2O_7$ (where RE is a rare earth element).

In some embodiments, to achieve a $RE_2O_3$—$ZrO_2$ (and/or $HfO_2$) compound phase constitution, the TBC composition may include between about 20 mol. % and about 40 mol. % primary dopant, between about 10 mol. % and about 20 mol. % first co-dopant, between about 10 mol. % and about 20 mol. % second co-dopant, and a balance base oxide and any impurities present.

In some embodiments, to achieve a cubic phase constitution, the TBC composition includes between about 4 mol. % and about 10 mol. % primary dopant, between about 1 mol. % and about 5 mol. % first co-dopant, between about 1 mol. % and about 5 mol. % second co-dopant, and a balance base oxide and any impurities present.

In some embodiments, to achieve a metastable tetragonal phase constitution, the TBC composition includes between about 2 mol. % and about 5 mol. % primary dopant, between about 0.5 mol. % and about 3 mol. % first co-dopant, between about 0.5 mol. % and about 3 mol. % second co-dopant, and a balance base oxide and any impurities present.

In some embodiments, instead of being deposited as a porous layer, the layer including the TBC composition 26 may be deposited as a substantially nonporous layer or a layer including a columnar microstructure. In any case, the layer including the TBC composition 26 may be deposited by, for example, plasma spraying, PVD, CVD, or a slurry deposition process. One type of PVD which may be used to deposit the layer including the TBC composition 26 is EB-PVD. One type of EB-PVD which may be used to deposit the layer including the TBC composition 26 is DVD. In DVD, an energy source generates an electron beam which vaporizes a portion of a target material including components to be deposited in the layer including the TBC composition 26. The vaporized material is then directed to substrate 12 using a transonic gas stream. This may allow greater deposition efficiency than EB-PVD, and may also allow non-line-of-sight deposition.

In some embodiments, the layer including the TBC composition 26 may be deposited using plasma deposition. In cases in which the layer including the TBC composition 26 includes a porous microstructure, the material which forms the layer including the TBC composition 26 may be co-deposited with a sacrificial material, such as a polyester, which is removed after deposition of the layer including the TBC composition 26 to form pores.

The layer including the TBC composition 26 may be formed to any thickness which provides a predetermined amount of protection to substrate 12. In some embodiments, the layer including the TBC composition 26 may include a thickness of between about 0.5 mil and about 20 mils.

Multilayer TBC 24 also includes CMAS-resistant TBC layer 28, which in the embodiment illustrated in FIG. 2, overlies the layer including the TBC composition 26. CMAS-resistant TBC layer 28 may include any of the compositions and microstructures described with reference to CMAS-resistant TBC layer 18 shown in FIG. 1. For example, CMAS-resistant TBC layer 28 may include a mixture or alloy of a TBC composition and a CMAS-resistant composition. The TBC composition in CMAS-resistant TBC layer 28 may include any of the TBC compositions described herein, such as, for example, yttria-stabilized zirconia, yttria-stabilized hafnia, zirconia stabilized by at least three rare earth oxides, or hafnia stabilized by at least three rare earth oxides. Examples of suitable TBC compositions for use in CMAS-resistant TBC layer 28 are described above with respect to FIG. 1. In some embodiments, the TBC composition in the CMAS-resistant TBC layer 28 may be substantially similar to the TBC composition in the layer including the TBC composition 26. In other embodiments, the TBC composition in the CMAS-resistant TBC layer 28 may be different than the TBC composition in the layer including the TBC composition 26.

CMAS-resistant TBC layer 28 also includes a CMAS-resistant composition. As described above with respect to CMAS-resistant TBC layer 18 in FIG. 1, the CMAS-resistant composition may include alumina, silica, and at least one rare earth oxide. In some embodiments, the CMAS-resistant composition may include between about 1 mol. % and about 99 mol. % of at least one rare earth oxide and between about 1 mol. % and about 99 mol. % alumina and silica. In other embodiments, the CMAS-resistant composition may include between about 10 mol. % and about 90 mol. % of at least one rare earth oxide and between about 10 mol. % and about 90 mol. % alumina and silica. In other embodiments, the CMAS-resistant composition may include between about 20 mol. % and about 80 mol. % of at least one rare earth oxide and between about 20 mol. % and about 80 mol. % alumina and silica.

Optionally, the CMAS-resistant composition may further include an additive, such as at least one of $TiO_2$, $Ta_2O_5$, $HfSiO_4$, an alkali oxide, or an alkali earth oxide. In some embodiments, the additive may be added to the CMAS-resistant TBC layer 28 to modify one or more property of the CMAS-resistant TBC layer 28.

As described above with respect to CMAS-resistant TBC layer 18 of FIG. 1, CMAS-resistant TBC layer 28 may include a mixture or alloy of the TBC composition and the CMAS-resistant composition. For example, CMAS-resistant TBC layer 28 may include between about 1 wt. % and about 99 wt. % TBC composition and between about 1 wt. % and about 99 wt. % CMAS-resistant composition. In some embodiments, CMAS-resistant TBC layer 28 includes between about 50 wt. % and about 90 wt. % TBC composition and between about 10 wt. % and about 50 wt. % CMAS-resistant composition. In other embodiments, CMAS-resistant TBC layer 28 includes between about 50 wt. % and about 70 wt. % TBC composition and between about 30 wt. % and about 50 wt. % CMAS-resistant composition.

CMAS-resistant TBC layer 28 may include a substantially dense microstructure, a porous microstructure, or a columnar microstructure. CMAS-resistant TBC layer 28 may be deposited by, for example, plasma spraying, PVD, CVD, or a slurry deposition process. One type of PVD which may be used to deposit CMAS-resistant TBC layer 28 is EB-PVD. One type of EB-PVD which may be used to deposit CMAS-resistant TBC layer 28 is DVD.

CMAS-resistant TBC layer 28 may be formed to any suitable thickness such that layer 28 provides predetermined protection to substrate 12. In some embodiments, CMAS-resistant TBC layer 28 may be formed to a thickness between about 0.5 mil and about 20 mils.

In some embodiments, multilayer TBC 24 may provide greater thermal protection to substrate 12 than a single layer TBC of similar composition as layer 26. For example, multilayer TBC 24 includes an interface between layers including two different compositions (CMAS-resistant TBC layer 26 and the layer including the TBC composition 24). While not wishing to be bound by theory, interfaces between two layers having different compositions may reduce a thermal conductivity of multilayer TBC 20 compared to a single layer TBC having a similar composition because the interfaces between the layers provide phonon scattering points. The phonon scattering points reduce an effective thermal conductivity of the multilayer TBC 20 considered as a whole.

Additionally, as described above, components in CMAS-resistant TBC layer 28 may react with CMAS that contacts layer 28 to form a solid or highly viscous reaction product. The reaction product may have a melting temperature significantly higher than CMAS (e.g., higher than about 1200-1250° C.). A solid or highly viscous reaction product is desired because the CMAS-resistant TBC layer 28 is consumed as it reacts with CMAS. If, for example, the reaction product of CMAS-resistant TBC layer 28 and CMAS was a relatively low viscosity liquid, the low viscosity liquid could infiltrate pores or cracks of a porous or columnar layer 26 as CMAS-resistant TBC layer 28 is consumed, which is the very occurrence the CMAS-resistant TBC layer 28 is designed to prevent.

If the reaction product is a solid or highly viscous, however, a reaction layer may form on or near the surface of CMAS-resistant TBC layer 28 (e.g., within pores or cracks in CMAS-resistant TBC layer 28 near the outer surface of the layer 28), which may lower the reaction rate of the CMAS with CMAS-resistant TBC layer 28. That is, once a solid or highly viscous reaction layer forms on or near the surface of CMAS-resistant TBC layer 28, the reaction between CMAS-resistant TBC layer 28 and CMAS may slow, because any further reaction will require the diffusion of CMAS through the reaction layer to encounter the CMAS-resistant TBC layer 28, or diffusion of a component of CMAS-resistant TBC layer 18 through the reaction layer to encounter the CMAS. In either case, the diffusion of either CMAS or the component of CMAS-resistant TBC layer 28 is expected to be the limiting step in the reaction once a solid or highly viscous reaction layer is formed on the surface of CMAS-resistant TBC layer 28, because diffusion is expected to be be the slowest process. In this way, CMAS-resistant TBC layer 28 may provide CMAS resistance to multilayer TBC 24.

Figure 3:
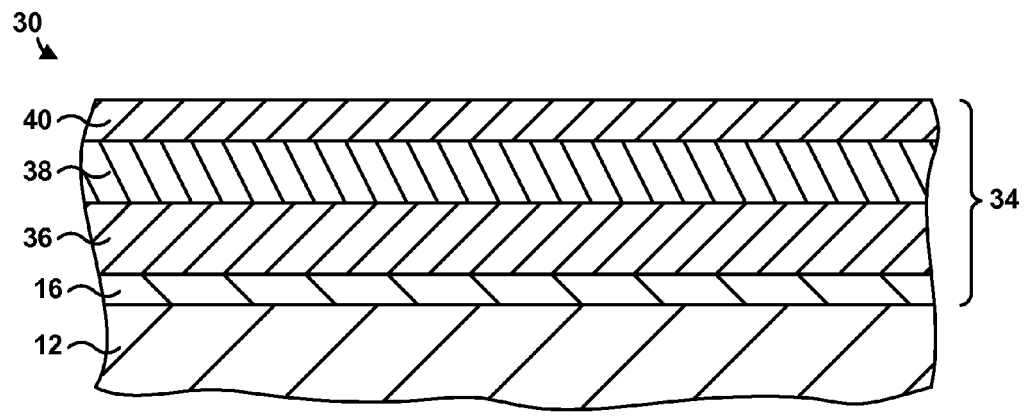
FIG. 3 is a conceptual cross-sectional diagram illustrating an example article including a substrate, a bond layer overlying the substrate, a first layer including a TBC composition overlying the bond layer, a CMAS-resistant TBC layer overlying the first layer including the TBC composition, and a second layer including a TBC composition overlying the CMAS-resistant TBC layer.
Figure 4:
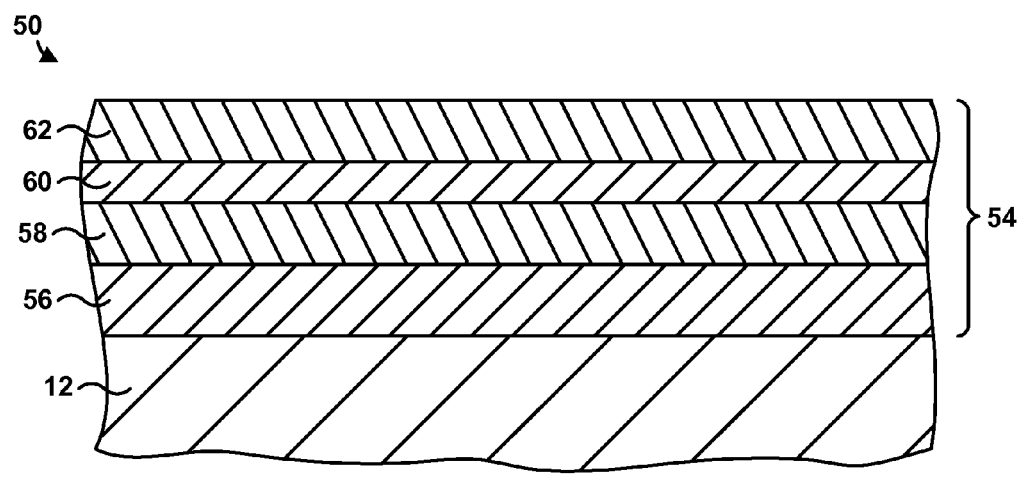
FIG. 4 is a conceptual cross-sectional diagram illustrating an example article including a substrate, a first layer including a TBC composition overlying the substrate, a first CMAS-resistant TBC layer overlying the first layer including the TBC composition, and a second layer including a TBC composition overlying the first CMAS-resistant TBC layer, and a second CMAS-resistant TBC layer overlying the second layer including the TBC composition.
Figure 5:
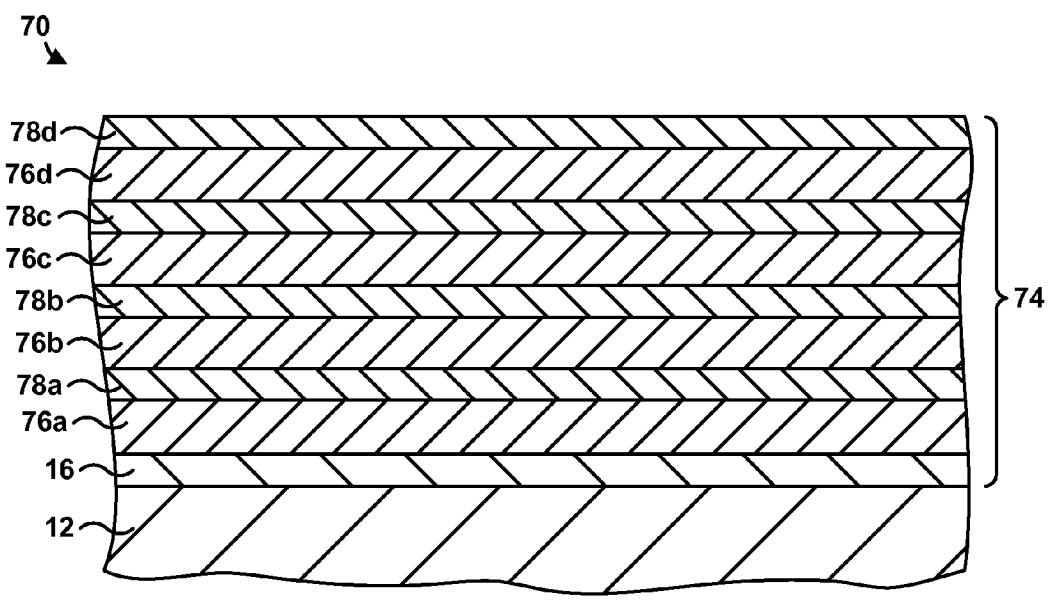
FIG. 5 is a conceptual cross-sectional diagram illustrating an example article including a substrate, a bond layer overlying the substrate, a plurality of layers including a TBC composition overlying the bond layer, and a plurality of CMAS-resistant TBC layers overlying the bond layer, where respective ones of the plurality of layers including a TBC composition alternate with respective ones of the CMAS-resistant TBC layers.

As shown in FIGS. 3, 4, and 5, in some embodiments, a TBC may include additional layers. For example, FIG. 3 illustrates an article 30 including a substrate coated with a multilayer TBC 34. In the embodiment illustrated in FIG. 3, the multilayer TBC 34 includes a bond layer 16, a first layer 36 including a TBC composition overlying the bond layer 16, a CMAS-resistant TBC layer 38 overlying the first layer 36, and a second layer 40 including a TBC composition overlying the CMAS-resistant TBC layer 38.

Substrate 12 and bond layer 16 may include similar compositions as described above with respect to FIGS. 1 and 2. Additionally, in some embodiments, multilayer TBC 34 may not include a bond layer 16, and first layer 36 may be formed directly on substrate, as described above.

First layer 36 may include any TBC composition described herein. For example, first layer 36 may include yttria-stabilized zirconia, yttria-stabilized hafnia, zirconia stabilized with at least three rare earth oxide, or hafnia stabilized with at least three rare earth oxides. As described above, in some embodiments, the TBC composition may include a base oxide, a primary dopant, a first co-dopant, and a second co-dopant.

First layer 36 may be formed as a substantially nonporous layer, as a porous layer, or as a columnar layer. In some embodiments, first layer 36 may be deposited by, for example, plasma spraying, PVD, CVD, or a slurry deposition process. One type of PVD which may be used to deposit the layer including the TBC composition 26 is EB-PVD. One type of EB-PVD which may be used to deposit the layer including the TBC composition 26 is DVD. First layer 36 may be formed to a thickness of about 0.5 mils to about 20 mils.

CMAS-resistant TBC layer 38 overlies first layer 36, and includes a TBC composition and a CMAS-resistant composition. The TBC composition in CMAS-resistant TBC layer 38 may include any of the TBC compositions described herein, such as, for example, yttria-stabilized zirconia, yttria-stabilized hafnia, zirconia stabilized by at least three rare earth oxides, or hafnia stabilized by at least three rare earth oxides. Examples of suitable TBC compositions for use in CMAS-resistant TBC layer 38 are described above with respect to FIG. 1. In some embodiments, the TBC composition in the CMAS-resistant TBC layer 38 may be substantially similar to at least one of the TBC composition in the first layer 36 including the TBC composition or the TBC composition in the second layer 40 including the TBC composition. In other embodiments, the TBC composition in the CMAS-resistant TBC layer 38 may be different than the TBC compositions in the first layer 36 including the TBC composition and the second layer 40 including the TBC composition.

CMAS-resistant TBC layer 38 also includes a CMAS-resistant composition. As described above with respect to CMAS-resistant TBC layer 18 in FIG. 1, the CMAS-resistant composition may include alumina, silica, and at least one rare earth oxide. In some embodiments, the CMAS-resistant composition may include between about 1 molar percent (mol. %) and about 99 mol. % of at least one rare earth oxide and between about 1 mol. % and about 99 mol. % alumina and silica. In other embodiments, the CMAS-resistant composition may include between about 10 mol. % and about 90 mol. % of at least one rare earth oxide and between about 10 mol. % and about 90 mol. % alumina and silica. In other embodiments, the CMAS-resistant composition may include between about 20 mol. % and about 80 mol. % of at least one rare earth oxide and between about 20 mol. % and about 80 mol. % alumina and silica.

Optionally, the CMAS-resistant composition may further include an additive, such as at least one of $TiO_2$, $Ta_2O_5$, $HfSiO_4$, an alkali oxide, or an alkali earth oxide. In some embodiments, the additive may be added to the CMAS-resistant TBC layer 38 to modify one or more property of the CMAS-resistant TBC layer 38, as described above.

CMAS-resistant TBC layer 38 may include a mixture or alloy of the TBC composition and the CMAS-resistant composition. For example, CMAS-resistant TBC layer 28 may include between about 1 wt. % and about 99 wt. % TBC composition and between about 1 wt. % and about 99 wt. % CMAS-resistant composition. In some embodiments, CMAS-resistant TBC layer 38 includes between about 50 wt. % and about 90 wt. % TBC composition and between about 10 wt. % and about 50 wt. % CMAS-resistant composition. In other embodiments, CMAS-resistant TBC layer 38 includes between about 50 wt. % and about 70 wt. % TBC composition and between about 30 wt. % and about 50 wt. % CMAS-resistant composition.

CMAS-resistant TBC layer 38 may include a substantially dense microstructure, a porous microstructure, or a columnar microstructure. CMAS-resistant TBC layer 38 may be deposited by, for example, plasma spraying, PVD, CVD, or a slurry deposition process. One type of PVD which may be used to deposit CMAS-resistant TBC layer 38 is EB-PVD. One type of EB-PVD which may be used to deposit CMAS-resistant TBC layer 38 is DVD.

CMAS-resistant TBC layer 38 may be formed to any suitable thickness such that layer 38 provides predetermined protection to substrate 12. In some embodiments, CMAS-resistant TBC layer 38 may be formed to a thickness between about 0.5 mils and about 20 mils.

Multilayer EBC 34 further includes second layer 40 including a TBC composition. Second layer 40 may include any TBC composition described herein. For example, second layer 40 may include yttria-stabilized zirconia, yttria-stabilized hafnia, zirconia stabilized with at least three rare earth oxides, or hafnia stabilized with at least three rare earth oxides. As described above, in some embodiments, the TBC composition may include a base oxide, a primary dopant, a first co-dopant, and a second co-dopant.

In some embodiments, second layer 40 includes a similar TBC composition as at least one of first layer 36 and CMAS-resistant TBC layer 38. In other embodiments, second layer 40 includes a different TBC composition than at least one of first layer 36 and CMAS-resistant TBC layer 38.

Second layer 40 may be formed as a substantially nonporous layer, as a porous layer, or as a columnar layer. In some embodiments, second layer 40 may be deposited by, for example, plasma spraying, PVD, CVD, or a slurry deposition process. One type of PVD which may be used to deposit the second layer 40 including the TBC composition is EB-PVD. One type of EB-PVD which may be used to deposit second layer 40 is DVD.

Second layer 40 may be formed to any predetermined thickness. In some embodiments, second layer 40 may include a thickness that is less than a thickness of first layer 36. In other embodiments, second layer 40 may include a thickness which is substantially the same or ever greater than a thickness of first layer 36. In some embodiments, second layer 40 may have a thickness of between about 0.5 mils and about 20 mils.

In some embodiments, second layer 40 may reduce a rate at which CMAS and CMAS-resistant TBC layer 38 react by reducing the rate at which CMAS comes into contact with CMAS-resistant TBC layer 38. Similar to a solid or highly viscous reaction layer formed on CMAS-resistant TBC layer 28 (described with respect to FIG. 2), second layer 40 may function as a layer through which CMAS must pass in order to come into contact with CMAS-resistant TBC layer 38. This reduction in effective reaction rate may prolong the life of CMAS-resistant TBC layer 38 and increase the protection afforded by CMAS-resistant TBC layer 38 to first layer 36 compared to an article 30 which does not include a second layer 40 including a TBC composition. Accordingly, in some embodiments, the combination of the presence of second layer 40 and the formation of a solid or highly viscous reaction product from the reaction of CMAS-resistant TBC layer 38 and CMAS may substantially prevent infiltration of molten CMAS in pores or cracks of first layer 26.

Additionally or alternatively, multilayer TBC 34 may provide greater thermal protection to substrate 12 than a single layer TBC of similar composition as first layer 36. For example, multilayer TBC 34 includes two interfaces between layers including two different compositions (between first layer 36 and CMAS-resistant TBC layer 38, and between CMAS-resistant TBC layer 38 and second layer 40). While not wishing to be bound by theory, interfaces between two layers having different compositions may reduce a thermal conductivity of multilayer TBC 34 compared to a single layer TBC having a similar composition because the interfaces between the layers provide phonon scattering points. The phonon scattering points reduce an effective thermal conductivity of the multilayer TBC 34 considered as a whole.

In some embodiments, as illustrated in FIG. 4, an article 50 may include a substrate 12 coated a multilayer TBC 54 having additional layers. In the example illustrated in FIG. 4, multilayer TBC 54 includes a first layer 56 including a TBC composition, a first CMAS-resistant TBC layer 58, a second layer 60 including a TBC composition, and a second CMAS-resistant TBC layer 62.

Although not shown in FIG. 4, in some embodiments, multilayer TBC 54 may include a bond layer 16, as described above with respect to FIGS. 1-3.

First layer 56 and second layer 60 may be similar to the analogous structures described above with respect to FIGS. 2 and 3 (the layer including a TBC composition 26 in FIG. 2 and first layer 36 and second layer 40 in FIG. 3). Each of first layer 56 and second layer 60 may include any combination of compositions and thicknesses described above with respect to similar layers in FIGS. 2 and 3. For example, first layer 56 and second layer 60 may each include a thermal barrier coating composition. The compositions of first layer 56 and second layer 60 may be independently selected. In some embodiments, first layer 56 has the same composition as second layer 60, while in other embodiments, first layer 56 has a different composition than second layer 60.

First CMAS-resistant TBC layer 58 and second CMAS-resistant TBC layer 62 may each include a composition similar to those described above with respect to CMAS-resistant TBC layer 18 of FIG. 1. For example, at least one of first CMAS-resistant TBC layer 58 and second CMAS-resistant TBC layer 62 may include a TBC composition and a CMAS-resistant composition.

The TBC composition in at least one of first CMAS-resistant TBC layer 58 or second CMAS-resistant TBC layer 62 may include any of the TBC compositions described herein, such as, for example, yttria-stabilized zirconia, yttria-stabilized hafnia, zirconia stabilized by at least three rare earth oxides, or hafnia stabilized by at least three rare earth oxides. Examples of suitable TBC compositions for use in first CMAS-resistant TBC layer 58 and/or second CMAS-resistant TBC layer 62 are described above with respect to CMAS-resistant TBC layer 18 in FIG. 1.

The TBC compositions in first CMAS-resistant TBC layer 58 and second CMAS-resistant TBC layer 62 may be independently selected. In some embodiments, the TBC composition in at least one of first CMAS-resistant TBC layer 58 or second CMAS-resistant TBC layer 62 may be substantially similar to at least one of the TBC composition in the first layer 56 including the TBC composition or the TBC composition in the second layer 60 including the TBC composition. In other embodiments, the TBC composition in the at least one of first CMAS-resistant TBC layer 58 or second CMAS-resistant TBC layer 62 may be different than the TBC compositions in the first layer 36 including the TBC composition and the second layer 40 including the TBC composition.

First CMAS-resistant TBC layer 58 and second CMAS-resistant TBC layer 62 also include CMAS-resistant compositions. As described above with respect to CMAS-resistant TBC layer 18 in FIG. 1, the CMAS-resistant composition may include alumina, silica, and at least one rare earth oxide. In some embodiments, the CMAS-resistant composition may include between about 1 molar percent (mol. %) and about 99 mol. % of at least one rare earth oxide and between about 1 mol. % and about 99 mol. % alumina and silica. In other embodiments, the CMAS-resistant composition may include between about 10 mol. % and about 90 mol. % of at least one rare earth oxide and between about 10 mol. % and about 90 mol. % alumina and silica. In other embodiments, the CMAS-resistant composition may include between about 20 mol. % and about 80 mol. % of at least one rare earth oxide and between about 20 mol. % and about 80 mol. % alumina and silica.

Optionally, the CMAS-resistant composition may further include an additive, such as at least one of $TiO_2$, $Ta_2O_5$, $HfSiO_4$, an alkali oxide, or an alkali earth oxide. In some embodiments, the additive may be added to at least one of CMAS-resistant TBC layer 58 or second CMAS-resistant TBC layer 62 to modify one or more property of the CMAS-resistant TBC layer 38, as described above. Again, first CMAS-resistant TBC layer 58 or second CMAS-resistant TBC layer 62 may comprise independently selected CMAS compositions, which may be the same or different.

First CMAS-resistant TBC layer 58 and second CMAS-resistant TBC layer 62 each may include a mixture or alloy of a TBC composition and a CMAS-resistant composition. For example, at least one of first CMAS-resistant TBC layer 58 and second CMAS-resistant TBC layer 62 may include between about 1 wt. % and about 99 wt. % TBC composition and between about 1 wt. % and about 99 wt. % CMAS-resistant composition. In some embodiments, at least one of first CMAS-resistant TBC layer 58 second CMAS-resistant TBC layer 62 includes between about 50 wt. % and about 90 wt. % TBC composition and between about 10 wt. % and about 50 wt. % CMAS-resistant composition. In other embodiments, at least one of first CMAS-resistant TBC layer 58 second CMAS-resistant TBC layer 62 includes between about 50 wt. % and about 70 wt. % TBC composition and between about 30 wt. % and about 50 wt. % CMAS-resistant composition.

First CMAS-resistant TBC layer 58 and second CMAS-resistant TBC layer 62 each may include a substantially dense microstructure, a porous microstructure, or a columnar microstructure. The microstructures of first CMAS-resistant layer 58 and second CMAS-resistant TBC layer 62 may be independently selected, and may be the same or different. First CMAS-resistant TBC layer 58 and second CMAS-resistant TBC layer 62 each may be deposited by, for example, plasma spraying, PVD, CVD, or a slurry deposition process. One type of PVD which may be used to deposit at least one of first CMAS-resistant TBC layer 58 and second CMAS-resistant TBC layer 62 is EB-PVD. One type of EB-PVD which may be used to deposit at least one of first CMAS-resistant TBC layer 58 and second CMAS-resistant TBC layer 62 is DVD.

Each of first CMAS-resistant TBC layer 58 and second CMAS-resistant TBC layer 62 may be formed to any suitable thickness such that the layer 58, 62 provides predetermined protection to substrate 12. In some embodiments, at least one of first CMAS-resistant TBC layer 58 or second CMAS-resistant TBC layer 62 may be formed to a thickness between about 0.5 mils and about 20 mils.

In some embodiments, a multilayer TBC 54 including first CMAS-resistant TBC layer 58 and second CMAS-resistant TBC layer 62 may provide additional resistance to CMAS compared to a coating which includes only a single CMAS-resistant TBC layer. For example, second CMAS-resistant TBC layer 62 may provide initial protection from CMAS. In some embodiments, second CMAS-resistant TBC layer 62 may react with CMAS present on the outer surface of second CMAS-resistant TBC layer 62 to form a reaction layer. The reaction layer may include a solid or highly-viscous material, which may lower the reaction rate of the CMAS with second CMAS-resistant TBC layer 62. That is, once a solid or highly viscous reaction layer forms on the surface of second CMAS-resistant TBC layer 62, the reaction between second CMAS-resistant TBC layer 62 and CMAS may slow, because any further reaction will require the diffusion of CMAS through the reaction layer to encounter second CMAS-resistant TBC layer 62, or diffusion of a component of second CMAS-resistant TBC layer 62 through the reaction layer to encounter the CMAS. In either case, the diffusion of either CMAS or the component of second CMAS-resistant TBC layer 62 is expected to be the limiting step in the reaction when a solid or highly-viscous reaction layer is formed on the surface of second CMAS-resistant TBC layer 62.

Even if a reaction layer does not form on the surface of second CMAS-resistant TBC layer 62 and/or sufficient time passes to allow sufficient CMAS to react with second CMAS-resistant TBC layer 62 such that second CMAS-resistant TBC layer 62 is consumed, first CMAS-resistant TBC layer 58 (and, in some embodiments, second layer 60) may provide protection from CMAS to first layer 56, as described above with respect to FIG. 3. In this way, second CMAS-resistant TBC layer 62, first CMAS-resistant TBC layer 58, and, optionally, second layer 60 may provide redundant protection from CMAS to first layer 56 and substrate 12.

Additionally or alternatively, in some embodiments, multilayer TBC 54 may provide greater thermal protection to substrate 12 than a thermal barrier coating of equivalent thickness which includes only a single layer. As described above, this may be because the interfaces between the respective layers provide scattering sites for phonons which transmit the thermal energy through coating 32.

In some embodiments, the concept of alternating layers including a TBC composition and CMAS-resistant TBC layers may be expanded beyond two layers including a TBC composition and two CMAS-resistant TBC layers. For example, as illustrated in FIG. 5, an article 70 may include a multilayer TBC 74 including four layers 76a, 76b, 76c, 76d including a TBC composition (collectively "layers 76") and four CMAS-resistant TBC layers 78a, 78b, 78c, 78d (collectively "CMAS-resistant TBC layers 78"). While FIG. 5 illustrates an article including four layers 76 including a TBC composition and four CMAS-resistant TBC layers 78, an article may include any number of layers 76 including a TBC composition and any number of CMAS-resistant TBC layers 78. In some embodiments, an article includes an equal number of layers 76 including a TBC composition and CMAS-resistant TBC layers 78, while in other embodiments, an article may include a different number of layers 76 including a TBC composition than CMAS-resistant TBC layers 78. In embodiments in which an article includes a different number of layers 76 including a TBC composition than CMAS-resistant TBC layers 78, the article may include either a greater number of layers 76 including a TBC composition or a lesser number of layers 76 including a TBC composition.

Each of layers 76 may include an independently selected TBC composition. Each of the TBC compositions may be selected from the TBC compositions disclosed herein.

Additionally, each of CMAS-resistant TBC layers 78 may include an independently selected composition. In some embodiments, at least two of the CMAS-resistant TBC layers 78 may have the same composition. The composition of the individual CMAS-resistant TBC layers 78 may include any of the compositions described above with respect to FIGS. 1-4, e.g., a mixture or alloy of a TBC composition and a CMAS-resistant composition.

In some embodiments, an upper layer of multilayer TBC 74 is a CMAS-resistant TBC layer 78d, as illustrated in FIG.

5. However, in other embodiments, an upper layer of multilayer TBC 74 may be a layer 76 including a TBC composition.

In some embodiments, a multilayer TBC 74 including a plurality CMAS-resistant TBC layers 78 alternating with a plurality of layers 76 including a TBC composition may provide advantages. For example, multilayer TBC 74 may provide greater thermal protection (e.g., have a lower effective thermal conductivity) than a coating including a single layer of similar thickness as multilayer TBC 74. As described above, while not wishing to be bound by theory, the interfaces between dissimilar layers (e.g., between layer 76a and CMAS-resistant TBC layer 78a) provide phonon scattering points, which may reduce thermal conductivity of multilayer TBC 74 compared to a coating without interfaces between dissimilar layers. In some embodiments, a greater number of alternating layers may provide a greater reduction in thermal conductivity of multilayer TBC 74. Additionally or alternatively, multilayer TBC 74 may provide improved CMAS-resistance to substrate 12 compared to a coating including a single CMAS-resistant TBC layer, as the multiple CMAS-resistant TBC layers 78 may provide redundant protection against CMAS infiltration into pores or cracks of layers 76.

Various embodiments of the disclosure have been described. These and other embodiments are within the scope of the following claims.

The invention claimed is:

1. An article comprising:
    a superalloy substrate; and
    a calcia-magnesia-alumina-silicate (CMAS)-resistant thermal barrier coating (TBC) layer overlying the superalloy substrate, wherein the CMAS-resistant TBC layer comprises:
        between about 50 wt. % and about 90 wt. % of a TBC composition, wherein the TBC composition comprises at least one of hafnia or zirconia stabilized with the following rare earth oxides:
            between about 20 mol. % and about 40 mol. % ytterbia,
            between about 10 mol. % and about 20 mol. % samaria, and
            between about 10 mol. % and about 20 mol. % of at least one of lutetia, scandia, ceria, gadolinia, neodymia, or europia, wherein the TBC composition comprises more ytterbia than samaria and more ytterbia than the at least one of lutetia, scandia, ceria, gadolinia, neodymia, or europia, and
        between about 10 wt. % and about 50 wt. % of a CMAS-resistant composition, wherein the CMAS-resistant composition comprises alumina, silica, and an oxide of at least one of Sc, Y, La, Ce, Pr, Nd, Pm, Sm, Eu, Gd, Yb, Dy, Ho, Er, Tm, Tb, or Lu.

2. The article of claim 1, wherein the CMAS-resistant TBC layer further comprises at least one of tantalum oxide, titanium oxide, hafnium silicate, an alkali oxide, or an alkali earth oxide.

3. The article claim 1, wherein the CMAS-resistant TBC layer comprises a thickness of between about 0.5 mils and about 20 mils.

4. The article of claim 1, wherein the TBC composition comprises a first TBC composition, further comprising
    a layer comprising a second TBC composition overlying the superalloy substrate, wherein the CMAS-resistant TBC layer overlies the layer comprising the TBC composition.

5. The article of claim 4, wherein the second TBC composition comprises hafnia stabilized with ytterbia, samaria, and at least one of lutetia, scandia, ceria, gadolinia, neodymia, or europia.

6. The article of claim 4, further comprising a bond layer overlying the superalloy substrate, and wherein the layer comprising the first TBC composition overlies the bond layer.

7. The article of claim 4, wherein the layer comprising the second TBC composition comprises a first layer, further comprising a second layer comprising a third TBC composition overlying the CMAS-resistant TBC layer, wherein the third TBC composition comprises at least one of yttria-stabilized zirconia, yttria-stabilized hafnia, zirconia stabilized with at least three rare earth oxides, or hafnia stabilized with at least three rare earth oxides.

8. The article of claim 7, wherein the first layer comprises a thickness of between about 0.5 mils and about 20 mils, wherein the CMAS-resistant TBC layer comprises a thickness of between about 0.5 mils and about 20 mils, and wherein the second layer comprises a thickness of between about 0.5 mils and about 20 mils.

9. A method comprising:
    forming a calcia-magnesia-alumina-silicate (CMAS)-resistant thermal barrier coating (TBC) layer over a superalloy substrate, wherein the CMAS-resistant TBC layer comprises:
        between about 50 wt. % and about 90 wt. % of a TBC composition, wherein the TBC composition comprises at least one of hafnia or zirconia stabilized with the following rare earth oxides:
            between about 20 mol. % and about 40 mol. % ytterbia,
            between about 10 mol. % and about 20 mol. % samaria, and
            between about 10 mol. % and about 20 mol. % of at least one of lutetia, scandia, ceria, gadolinia, neodymia, or europia, wherein the TBC composition comprises more ytterbia than samaria and more ytterbia than the at least one of lutetia, scandia, ceria, gadolinia, neodymia, or europia, and
        between about 10 wt. % and about 50 wt. % of a CMAS-resistant composition, wherein the CMAS-resistant composition comprises alumina, silica and an oxide of at least one of Sc, Y, La, Ce, Pr, Nd, Pm, Sm, Eu, Gd, Yb, Dy, Ho, Er, Tm, Tb, or Lu.

10. The method of claim 9, wherein forming the CMAS-resistant TBC layer over the superalloy substrate comprises depositing the CMAS-resistant TBC layer over the superalloy substrate using at least one of chemical vapor deposition, plasma spraying, physical vapor deposition, or a slurry process.

11. The method of claim 9, wherein the thermal barrier coating (TBC) composition comprises a first TBC composition, further comprising:
    forming a layer comprising a second TBC composition over a superalloy substrate, wherein the second TBC composition comprises at least one of yttria-stabilized zirconia, yttria-stabilized hafnia, zirconia stabilized with at least three rare earth oxides, or hafnia stabilized with at least three rare earth oxides, and
    wherein forming the calcia-magnesia-alumina-silicate (CMAS)-resistant TBC layer over the superalloy substrate comprises forming the CMAS-resistant TBC layer over the layer comprising the second TBC composition.

12. The method of claim 11, further comprising:
    forming a layer comprising a third TBC composition over the CMAS-resistant TBC layer, wherein the third TBC composition comprises at least one of yttria-stabilized zirconia, yttria-stabilized hafnia, zirconia stabilized with at least three rare earth oxides, or hafnia stabilized with at least three rare earth oxides.

* * * * *